Oct. 31, 1933.  E. P. FLEMING ET AL  1,932,656
PROCESS OF RECOVERING METALLIC VALUES FROM SLAG
Filed Nov. 2, 1931
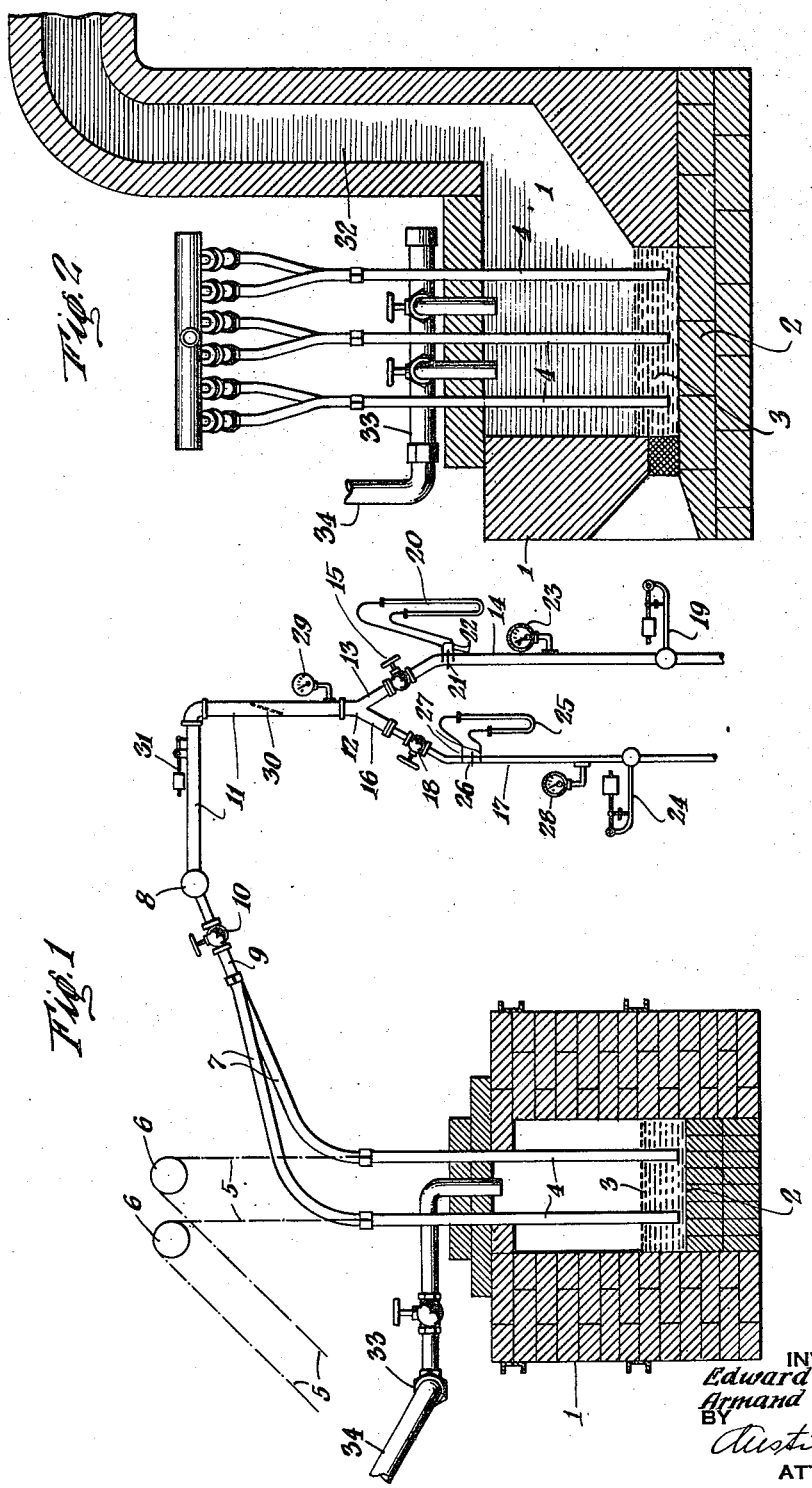
INVENTORS
Edward P. Fleming
Armand L. Labbe
BY
Austin & Dix
ATTORNEYS Patented Oct. 31, 1933

1,932,656

UNITED STATES PATENT OFFICE 1,932,656

PROCESS OF RECOVERING METALLIC VALUES FROM SLAG

Edward P. Fleming and Armand L. Labbe, Salt Lake City, Utah, assignors to American Smelting & Refining Company, New York, N. Y., a corporation of New Jersey Application November 2, 1931. Serial No. 572,522

12 Claims. (Cl. 75—17)

The present invention relates to a process for recovering metallic values from slag and more particularly to a process of recovering non-ferrous metals such as lead, zinc and silver from slag.

Heretofore, in the treatment of slag for the recovery of zinc and lead and other metals, the slag was maintained as a molten bath and then subjected to the action of a burning mixture of fuel and air. Usually, coal dust was employed as the source of fuel and the amount of air was so restricted as to be incapable of burning all of the coal. In other words, an excess of coal or other fuel was employed in order to maintain reducing conditions within and about the bath. The theory underlying the foregoing practice was that the excess of carbon reduced the metallic oxide such as zinc oxide to a metallic condition and that the metal such as zinc was then vaporized due to the temperature of the molten bath and thereafter reoxidized to zinc oxide. In the conduct of this process there were certain disadvantages as was well known by those skilled in the art. Although the investigators were struggling to overcome the disadvantages and to provide an improved process, no satisfactory and successful process has been proposed.

We have discovered a process which avoids the disadvantages of the prior art processes and which provides efficient results when carried out upon an industrial scale.

It has been found that the treatment of the molten slag should be carried out under oxidizing conditions and with an oxidizing mixture of fuel and air in order to obtain improved results over the conventional processes.

It is an object of the invention to provide a process for the treatment of molten slags for the recovery of non-ferrous metals including zinc, lead and silver in a simple, economical and practical manner.

It is a further object of the invention to provide a process for the treatment of slags for the recovery of non-ferrous metals by means of an oxidizing mixture containing gaseous fuel, such as natural gas.

It is a further object of the invention to provide a process for the treatment of lead blast furnace slag for the recovery of zinc in the condition of zinc oxide which has a light color and which is practically free from carbon and which is low in other impurities.

It is also within the contemplation of the invention to provide a process for the treatment of slag for the recovery of non-ferrous metals including zinc, lead and silver in which an air-gas mixture of an oxidizing nature which is readily controlled and easily adjusted is used.

A further object of the invention is to provide a process for the treatment of slag for the recovery of non-ferrous metals which does not require the use of expensive high-pressure air.

Other objects and advantages of the invention will become apparent from the following description taken in conjunction with the accompanying drawing in which:—

Fig. 1 is an end view, partly in section, of a volatilizing furnace capable of carrying the present invention into practice; and Fig. 2 is a longitudinal sectional view of the volatilizing furnace shown in Fig. 1.

In carrying the present invention into practice, it has been found preferable to maintain a strongly oxidizing atmosphere and to employ a strongly oxidizing mixture of air and fuel. For best results, it has been found to be preferable to employ a gaseous fuel, such as natural gas. Although a variety of mixtures having various compositions may be used, we prefer to utilize two mixtures simultaneously.

First, a primary mixture which is injected into the molten bath and, second, a secondary mixture which is injected from above the molten bath are preferably employed. For the primary mixture we prefer to utilize an air-fuel mixture in which the air is present from approximately 94 parts to 96 parts by volume and the gaseous fuel is present from 6 parts to 4 parts by volume. Primary air-fuel mixture is introduced below the surface of the bath at the rate of about 350 cubic feet per minute for each ton of molten slag in bath. The function of the primary mixture is to maintain the temperature of the bath at a predetermined maximum and to produce a relatively violent agitation, thereby producing an increased surface exposure. For this latter purpose a pressure of approximately 10 pounds per square inch is applied.

For the secondary mixture we prefer to utilize an air-fuel mixture in which the air is present from approximately 96 parts to 97 parts by volume and the gaseous fuel is present from 3 parts to 2 parts by volume. Secondary air-fuel mixture is supplied at the rate of about 600 cubic feet per minute for each ton of molten slag in bath. The function of the secondary mixture is to provide a maximum "sweeping" action of the gases for the purpose of removing the volatile oxides from the molten foam of slag produced by the primary mixture. The secondary mixture is injected onto or over the surface of the bath at a high velocity under approximately ½ pound pressure. The small percentage of fuel in this mixture is added to prevent substantial chilling action on the exposed slag surface.

It should be noted that the resultant air and fuel mixtures must always be in an oxidizing condition and preferably in a strongly oxidizing condition. This procedure is opposite to the procedure used by the prior art and, in fact, just contrary to the prior art theory.

However, it is to be clearly understood that the invention is not to be limited to the use of two or more mixtures either simultaneously or otherwise. We have found that satisfactory commercial results may be obtained under certain conditions by using only the primary mixture, although by such practice a longer time is required in which to obtain the same percentage of volatilization. Also, the ratio of air to gas may be modified to meet circumstances.

In treating a batch of molten slag of approximately 15 to 25 tons, the bath is maintained in a molten condition and the atmosphere associated with the bath is maintained in an oxidizing condition, preferably a strongly oxidizing condition. In the use of natural gas as the combustible fuel, it has been found that about 700 cu. ft. per minute to about 900 cu. ft. per minute of natural gas is sufficient when burned to maintain the 25 ton bath of molten slag at an appropriate temperature within a range of about 2500° F. to about 2600° F. A bath of slag if maintained at the aforesaid temperatures, is sufficiently hot and liquid to permit the direct volatilization and oxidation of the metals to be recovered and their volatilization as oxides.

For example, a sample of blast furnace slag ready to be treated by our process had the following composition:—Zinc as zinc silicate 11%; zinc as zinc sulphide 2%; zinc as zinc ferrite 2%; lead as lead silicate 1–2%; silver, 0.5 oz/ton of slag.

It should be realized that the so-called zinc silicate content of lead slags is an unstable compound. Investigation tends to show that the zinc oxide is held in igneous solution by ferrous silicates of low silica degree and that such zinc oxide has a slight vapor pressure. For example, the vapor pressure of zinc oxide at 1490° F. is about 0.001 of an atmosphere while at 2730° F. the vapor pressure is about 0.02 atmosphere. This indicates that a gas mixture bubbling up through the slag can carry approximately 2% by volume of zinc oxide vapor at 2700° F. The theoretical flame temperature for combustion of methane, corrected for dissociation, is about 3600° F. and it is apparent that the surface of slag can be subjected to temperatures in excess of 2700° F. indicated above. It is, therefore, readily seen why high temperatures combined with maximum slag surface exposure and large volume of contact air gives an efficient process for volatilizing zinc oxide from molten slag.

The oxidizing mixtures of air-natural gas promote more efficient volatilization of zinc oxide contained in slag than reducing mixtures, because the latter reduce material amounts of ferrous oxide to the metallic state and cause the bath to become viscous, thus retarding elimination.

The oxidizing mixtures also permit the Bessemerizing of zinc values present as sulphide with consequent volatilization as oxide.

In general the same principles stated above apply to the volatilization of oxides of lead and silver.

The above considerations permit the successful use of the secondary air-natural gas mixture. Not only is the air in this mixture more efficient than that now used in the art as generally understood, but the fact that it can be applied at very low pressures as compared to present practise, permits marked economies in power.

The oxide fumes, of course, are collected and recovered in any well known manner, preferably by the use of a Cottrell precipitator. In the preferred practise of the process, the hot gases are conveyed by a refractory flue to waste heat boilers in order to permit the utilization of some of the heat carried by the hot gases. In this manner, it is possible to obtain considerable fuel economy by the generation of steam. In addition, the hot gases are cooled and brought to a thermal condition appropriate for treatment and oxide recovery in a Cottrell electrical precipitator.

For bringing the primary mixture into contact with the molten slag, it is preferred to blow it through tuyères that may be immersed in the bath of molten slag and the secondary air-natural gas mixture down onto the surface of the bath of molten slag. By blowing the primary mixture at a pressure of approximately 10 pounds per square inch and secondary mixture at a pressure of ½ pound per square inch for a period of time extending from about 60 minutes to about 90 minutes, the zinc, lead and silver contained in the slag can be largely eliminated from the molten bath as oxide fumes and the remaining residual slag can be discarded. In practise, it has been found that about 75% to 85% of the zinc, about 95% to 100% of the lead and about 40% to 50% of the silver contained in the original slag can be recovered in the aforesaid manner.

The speed with which this reaction takes place is greatly increased by the use of the secondary air-gas mixture as indicated above.

The present process may be carried into practise by the use of various types of apparatus. It has been found satisfactory to utilize the volatilizing furnace illustrated in Figs. 1 and 2 of the accompanying drawing.

In the drawing, the reference character 1 generally designates a stationary hearth furnace constructed in a well known manner. The hearth 2 of the furnace is capable of holding a bath 3 of molten slag to the extent of about 15 to 25 tons.

Projecting into said molten bath are a plurality of tuyères 4 which are preferably made of alloy steel such as the well known chromium steel or nickel-chrome steel or the like. These tuyères may be adjusted to any level within said molten bath by the use of steel cables 5, which are mounted on appropriate pulleys 6. Flexible tubing 7 joins the upper ends of the adjustable tuyères to the main bustle pipe 8 carrying the air-fuel mixture. Interposed between the flexible tubing 7 and the bustle pipe 8 is a plurality of connections 9 containing valves 10.

The main bustle pipe 8 is supplied with the primary air-fuel mixture by means of pipe 11 which is joined to Y-connector 12. To one of the legs 13 of the Y-connector, an air pipe 14 is connected. In order to control the amount of air going to the Y-connector a valve 15 is provided in pipe 14. To the other leg 16 of the Y-connector 12 a gas pipe 17 for natural gas is connected via a valve 18.

In order to control the proper volumes of air and natural gas going to the main bustle pipe, appropriate regulators are employed. For instance, a constant pressure regulator 19 is provided in a well known manner in pipe 14. Above this regulator in pipe 14, a manometer 20 is provided in the usual manner. An orifice plate 21 is located within pipe 14 between the ends of the tubes 22 which lead to legs of the manometer 20. Between the manometer and the pressure regulator a gage 23 is provided for indicating the pressure within pipe 14.

In the same way, gas pipe 17 has a constant pressure regulator 24 operatively associated therewith. In the upper part of gas pipe 17 a manometer 25 is located. An orifice plate 26 is provided in the usual manner within the pipe between the ends 27 of the tubing leading to the legs of the manometer 25. Between the manometer and the pressure regulator, a gage 28 is provided to indicate the pressure in the gas pipe.

For showing the pressure of the combined air-gas mixture a gage 29 is provided in pipe 11. Above this pressure regulator a spiral 30 is located within the pipe 11 in order to insure a thorough mixing of the air and combustible gas. Beyond the spiral 30 and pipe-line 11, a safety valve 31 is mounted so as to release the gas mixture to the atmosphere when the pressure exceeds a limiting value, say, about 10 pounds per square inch.

The bustle pipe 33 is supplied with the secondary air-fuel mixture by means of pipe 34 which is connected to a duplicate metering and mixing device similar to that shown for the primary mixture. It should be noted, however, that the secondary mixture may be operated at a relatively much lower pressure than the primary mixture.

The operation of the aforesaid volatilizing furnace is obvious to those skilled in the art. Thus, a batch of about 15 to 25 tons of molten slag 3 is introduced into the hearth 2 of the stationary volatilizing furnace 1. Air is introduced through pipe-line 14 and natural gas is introduced through pipe line 17. The air and natural gas pass through connector 12 and then are thoroughly mixed by means of spiral 30 which is located in pipe 11. The mixed air-gas mixture passes to the main bustle pipe 8 where it is distributed to the plurality of connectors 9 which lead to tuyères 4.

By the provision of constant pressure regulators in the air line and gas line, a constant pressure of say 10 pounds per square inch is maintained in each of these lines and a uniform gas mixture is produced irrespective of variation in pressure in the feed pipe. Ordinarily, the gas and air in the feed or supply lines are maintained under a pressure of about 15 pounds per square inch. Safety valve 31 is set so that in the event that the pressure should exceed about 10 pounds per square inch in pipe 11, the safety valve is blown and the air-gas mixture is released to the atmosphere.

By regulating valves 15 and 18, the desired composition of the resultant air-gas mixture may be controlled. It is preferred to utilize such an adjustment in order that a mixture will be produced containing about 94% of air to about 6% of natural gas by volume. This gas mixture when burned will produce oxidizing conditions.

Corresponding apparatus and connections for the introduction and control of secondary mixtures are provided in a similar manner.

Although certain specific slags, temperatures, proportions, fuels, etc. have been described, it is to be noted that the invention is not to be limited thereto. For instance, in place of lead blast furnace slag carrying zinc, lead and silver, other slags may be used. Thus a copper slag containing metals such as zinc, lead and silver, etc., may be used instead of the lead blast furnace slag.

It is also to be noted that the process can be carried out in an apparatus other than the one described herein. Thus, a tilting furnace, preferably water-cooled with fixed tuyères entering along one side may be used in place of the stationary hearth furnace. Then again, a fixed vertical shaft furnace, preferably rectangular in cross section and water-cooled with horizontal rows of tuyères spaced along the two opposite sides may likewise be used. In the case of the tilting furnace, the immersion of the tuyères into the bath of the molten slag is effected by tilting the bath, whereas in the fixed vertical shaft furnace the tuyères are immersed to a depth of about 2 ft. or more by filling the shaft with molten slag while the blast is on. These and other variations are to be considered within the scope of the present invention as one skilled in the art will readily understand.

Broadly considered, the present invention contemplates a process for recovering metallic values, particularly zinc, lead and silver, from slag, particularly lead blast furnace slag, by keeping the slag in a molten liquid condition and preventing the slag from becoming pasty by heating and by maintaining oxidizing conditions and then agitating or thoroughly subdividing the mass of slag to permit the liberation of the metals principally in an oxidized condition.

What is claimed is:

1. The process of recovering metallic values from slag which comprises establishing a bath of molten slag, heating said bath directly with an air-gaseous fuel mixture containing an excess of air to maintain the slag in a molten condition and in contact with an oxidizing atmosphere, agitating said slag to liberate the metals as oxides and recovering said liberated metallic oxides.

2. The process of recovering metallic values from lead blast furnace slag containing metallic values including zinc which comprises establishing a molten bath of lead blast furnace slag containing metallic values including zinc, subjecting said bath to the direct action of a burning air-gaseous fuel mixture containing an excess of air, maintaining said slag in a molten state and preventing the formation of a pasty condition, agitating said molten bath of slag to liberate metallic oxides including zinc oxide and recovering said liberated zinc oxide.

3. The process of recovering metallic values from lead blast furnace slag containing metallic values including zinc which comprises establishing a molten bath of lead blast furnace slag containing metallic values including zinc, subjecting said bath to the direct action of burning air-natural gas mixtures containing an excess of air, blowing said burning air-natural gas mixtures into, through and upon said molten bath of slag to maintain the latter in a molten condition and to agitate the same to liberate the metallic values as oxides including zinc oxide and recovering said liberated oxide.

4. The process of recovering metallic values from lead blast furnace slag containing metallic values including zinc which comprises establishing a molten bath of lead blast furnace slag containing metallic values including zinc, subjecting said bath to the direct action of burning air-natural gas mixtures containing about 94-98 parts of air by volume and about 6-2 parts of natural gas by volume, blowing said burning air-natural gas mixtures into, through and upon said molten bath of slag to maintain the latter in a molten condition and to agitate the same to liberate the metallic values as oxides including zinc oxide and recovering said liberated zinc oxide.

5. The process of recovering metallic values from lead blast furnace slag containing metallic values including zinc which comprises establishing a molten bath of lead blast furnace slag containing metallic values including zinc, subjecting said bath to the direct action of burning air-natural gas mixtures containing about 94-98 parts of air by volume and about 6-2 parts of natural gas by volume, maintaining said molten bath of slag at a temperature of about 2500° F. to 2600° F., blowing said burning air-natural gas mixtures into, through and upon said molten bath of slag to maintain the latter in a molten condition and to agitate the same to liberate the metallic values as oxides including zinc oxide, and recovering said liberated zinc oxide.

6. The process of recovering metallic values from lead blast furnace slag containing metallic values including zinc which comprises establishing a molten bath of lead blast furnace slag containing metallic values including zinc, subjecting said bath to the direct action of a burning air-natural gas mixture containing about 94-96 parts of air by volume and about 6-4 parts of natural gas by volume, blowing said burning air-natural gas mixture into and through said molten bath of slag to maintain the latter in a molten condition and to agitate the same to liberate the metallic values as oxides including zinc oxide, continuing said blowing for a period of about fifty minutes to about ninety minutes to effect a liberation of the bulk of the metallic values as oxides, and recovering said liberated zinc oxide.

7. The process of recovering metallic values including zinc, lead and silver from a lead blast furnace slag which comprises establishing a molten bath of lead blast furnace slag containing metallic values including zinc, lead and silver, blowing an air-natural gas mixture containing about 94-96 parts of air by volume and about 6-4 parts of natural gas by volume into and through said bath of molten slag to maintain the same in a molten condition and to effect liberation of the metallic values as oxides including oxides of zinc, lead and silver, continuing the blowing of said burning air-natural gas mixture for a period of time of about 60-90 minutes to effect a liberation of the bulk of said zinc, lead and silver from the slag as oxides, and recovering said oxides of zinc, lead and silver.

8. The process of recovering metallic values including zinc, lead and silver from a lead blast furnace slag which comprises establishing a molten bath of lead blast furnace slag containing metallic values including zinc, lead and silver, locating tuyères with their open ends in contact with a part of the molten slag, blowing an air-natural gas mixture containing about 94-96 parts of air by volume and about 6-4 parts of natural gas by volume into and through said bath of molten slag via said tuyères to maintain the same at a temperature of about 2500° F. to about 2600° F. and to effect a liberation of the metallic values as oxides including oxides of zinc, lead and silver, continuing the blowing of said burning air-natural gas mixture for a period of time of about 60-90 minutes to effect a liberation of the bulk of said zinc, lead and silver from the slag as oxides, and recovering said oxides of zinc, lead and silver.

9. The process of recovering metallic values from slag comprising establishing a molten bath of slag containing metallic values, blowing a burning air-gaseous fuel mixture containing an excess of air into and through said bath of molten slag to maintain the latter in a molten condition and to effect a liberation of the metallic values as oxides, withdrawing the products of combustion of said air-fuel mixture together with said metallic oxides, cooling said gases and metallic oxides, and recovering said oxides.

10. The process of recovering metallic values from slag comprising establishing a molten bath of slag containing metallic values, blowing a burning air-gaseous fuel mixture containing an excess of air into and through said bath of molten slag to maintain the latter in a molten condition and to effect a liberation of the metallic values as oxides, withdrawing the products of combustion of said air-gaseous fuel mixture together with said metallic oxides, passing said hot gases and metallic oxides in contact with waste heat boilers to heat the latter and to cool the gases and oxides, and recovering said cooled oxides by electrically precipitating the same.

11. The process set forth in claim 3 in which a primary air-natural gas mixture is supplied at a constant pressure of about ten lbs. per sq. inch and a secondary air-natural gas mixture is supplied at a constant pressure of about ½ lb. per sq. inch.

12. In the treatment of material containing volatile metals the process that consists of subjecting a molten bath of such material to the action of natural gas with air in appropriate proportion to produce movement of the material in the bath and to maintain temperatures above the volatilization point of said volatile metals and subjecting the body of the bath to the action of natural gas mixed with air in sufficient proportions sufficient to produce oxidizing conditions and removing said volatile metals as fume as said fume is released at the surface of the bath.

EDWARD P. FLEMING.
ARMAND L. LABBE.